(12) United States Patent
Arnold et al.

(10) Patent No.: US 9,726,075 B2
(45) Date of Patent: Aug. 8, 2017

(54) ROD END TENSIONER AND SELF ADJUSTING ROD END

(71) Applicant: BorgWarner Inc., Auburn Hills, MI (US)

(72) Inventors: Stan Arnold, Hendersonville, NC (US); Daniel N Ward, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/412,725

(22) PCT Filed: Jul. 3, 2013

(86) PCT No.: PCT/US2013/049231
§ 371 (c)(1),
(2) Date: Jan. 5, 2015

(87) PCT Pub. No.: WO2014/011470
PCT Pub. Date: Jan. 16, 2014

(65) Prior Publication Data
US 2015/0159548 A1    Jun. 11, 2015

Related U.S. Application Data

(60) Provisional application No. 61/670,777, filed on Jul. 12, 2012.

(51) Int. Cl.
*F02B 37/24* (2006.01)
*F01D 17/16* (2006.01)

(52) U.S. Cl.
CPC .............. *F02B 37/24* (2013.01); *F01D 17/16* (2013.01); *F05D 2250/241* (2013.01);
(Continued)

(58) Field of Classification Search
CPC ...... Y10T 403/32631; Y10T 403/32721; Y10T 403/32737; Y10T 403/32745;
(Continued)

(56) References Cited

U.S. PATENT DOCUMENTS 1,559,402 A * 10/1925 Boardman ............... B62D 7/16
403/146
2,530,554 A * 11/1950 Tinnerman .......... F16C 11/0619
403/122
(Continued)

FOREIGN PATENT DOCUMENTS

JP       2005-315179 A    11/2005
KR    1020110076832 A     7/2011
(Continued)

OTHER PUBLICATIONS

International Application No. PCT/US2013/049231, International Search Report & Written Opinion, 9 pages, Oct. 1, 2013.

*Primary Examiner* — Jonathan Masinick
(74) *Attorney, Agent, or Firm* — BrooksGroup

(57) ABSTRACT

A self-adjusting rod end (10) comprising a rod end housing (12) including a connector portion (16), a ball housing portion (14) having an opening (18), and a race insert (26) disposed in the opening (18). A rod end ball (20) is disposed in the race insert (26) and a rod end tensioner (30) is positioned to apply a force (F) against an end of the rod end ball (20). The rod end tensioner (30) includes a clip portion (32) with a spring arm (34) extending therefrom, wherein the clip portion (32) includes a pair of tangs (38) positioned to engage the connector portion (16). The spring arm (34) includes a contact tip (36) confronting the end of the rod end ball (20).

12 Claims, 2 Drawing Sheets

(52) U.S. Cl.
CPC ...... *F05D 2260/30* (2013.01); *F05D 2260/50* (2013.01); *Y10T 403/32631* (2015.01)

(58) Field of Classification Search
CPC ..... Y10T 403/32754; Y10T 403/32762; Y10T 403/32811; Y10T 403/32713; Y10T 403/32729; F16C 11/06; F16C 11/0614; F16C 11/069
See application file for complete search history.

(56) References Cited

U.S. PATENT DOCUMENTS

| | | | | |
|---|---|---|---|---|
| 2,766,079 | A * | 10/1956 | Browne | F16C 11/0614 384/209 |
| 3,182,329 | A * | 5/1965 | Biesecker | H01Q 1/084 174/152 A |
| 3,430,995 | A * | 3/1969 | Herbenar | F16C 11/0671 277/390 |
| 3,817,639 | A * | 6/1974 | Good | F16B 2/248 403/122 |
| 4,758,110 | A * | 7/1988 | Ito | F16C 11/0638 403/122 |
| 5,066,160 | A * | 11/1991 | Wood | B62D 7/166 403/132 |
| 5,069,571 | A * | 12/1991 | Matczak | F16C 11/0614 277/369 |
| 5,613,792 | A * | 3/1997 | Terada | F16C 7/00 403/131 |
| 6,413,003 | B1 * | 7/2002 | Schmidt | B62D 7/16 403/120 |
| 7,037,023 | B2 * | 5/2006 | Monninghoff | F16C 11/0638 403/122 |
| 7,520,691 | B2 * | 4/2009 | Dearing | F16C 11/0604 280/93.51 |
| 2002/0076268 | A1 * | 6/2002 | Paduano | F16C 11/0619 403/149 |
| 2003/0161563 | A1 * | 8/2003 | Sasaki | F16C 11/0614 384/495 |
| 2004/0055297 | A1 | 3/2004 | Allmang et al. | |
| 2011/0227307 | A1 * | 9/2011 | Nataraj | B60G 7/005 280/124.1 |
| 2013/0328284 | A1 * | 12/2013 | Byrnes | B60G 7/005 280/124.151 |

FOREIGN PATENT DOCUMENTS

KR 1020120067475 A 6/2012
WO WO 2007/021132 A1 2/2007

* cited by examiner

ROD END TENSIONER AND SELF ADJUSTING ROD END

BACKGROUND

Today's internal combustion engines must meet ever-stricter emissions and efficiency standards demanded by consumers and government regulatory agencies. Accordingly, automotive manufacturers and suppliers expend great effort and capital in researching and developing technology to improve the operation of the internal combustion engine. Turbochargers are one area of engine development that is of particular interest.

A turbocharger uses exhaust gas energy, which would normally be wasted, to drive a turbine. The turbine is mounted to a shaft that in turn drives a compressor. The turbine converts the heat and kinetic energy of the exhaust into rotational power that drives the compressor. The objective of a turbocharger is to improve the engine's volumetric efficiency by increasing the density of the air entering the engine. The compressor draws in ambient air and compresses it into the intake manifold and ultimately the cylinders. Thus, a greater mass of air enters the cylinders on each intake stroke.

Given that a turbocharger must handle exhaust straight from the engine, it can be appreciated that the components of a turbocharger are subjected to extreme temperatures. Because the turbocharger is mounted to the engine, the turbocharger and its ancillary components are also subject to vibration. In addition to temperature, engine vibration contributes to wear among the various ancillary components including the variable turbine geometry (VTG) linkages.

In particular, the VTG linkages include rod ends that have a tendency to wear out. The rod ends wear due to two types of wear: pressure/velocity and vibration impact. During the initial life of the assembly, wear is limited to pressure/velocity and is relatively slow and linear. However, as clearance is worn between the ball and race, vibration impact wear becomes predominant. The vibration impact wear rate is much steeper and quickly leads to component failure. Accordingly, there is a need for a self adjusting rod end that compensates for clearance worn between the ball and race.

SUMMARY

Provided herein is a rod end tensioner and self adjusting rod end. In an embodiment, the self adjusting rod end includes a rod end housing, a rod end ball, and a rod end tensioner. The rod end housing comprises a ball housing portion and a connector portion. The ball housing portion includes a bearing opening that is sized and configured to receive a race insert. The rod end ball is disposed in the race insert.

The rod end tensioner includes a clip portion with a spring arm extending therefrom. The clip portion includes a pair of tangs and is configured to engage the connector portion. The spring arm is operative to apply a force against the end of the rod end ball. At a distal end of the spring arm is a contact tip that confronts the end of the rod end ball. The rod end tensioner acts to push the rod end ball into the race insert. Accordingly, the tensioner takes up any slack between the race insert and rod end ball caused by wear.

In another embodiment, the rod end tensioner is in the form of a spring clip that engages a rod end housing from the top and bottom. In this case, the race includes nested inner and outer race portions. The inner race portion may be a split ring that allows the inner race portion to contract against the rod end ball as the ball and race portions wear against each other. The tensioner captures a Belleville washer between a cross member portion and the inner race portion. The cross member portion, along with the Belleville washer, applies pressure against the inner race portion which in turn slides against the outer race portion to compress the inner race portion against the rod end ball as the components wear.

In yet another embodiment, the self-adjusting rod end includes a rod end housing and a tensioner in the form of a spring clip. In this case, the spring clip pushes against the rod end ball via a contact rib disposed on a spring loaded cross member, which applies pressure against rod end ball. The spring loaded cross member may be preloaded, or preformed, by providing an arcuate bend in the cross member portion, such that it applies additional force against the rod end ball.

In a still further embodiment, the self-adjusting rod end includes a rod end ball that rides in a race insert which is in turn disposed in ball housing. In this embodiment, the ball housing portion includes a pair of compression lands which are configured to apply pressure against the race insert. The compression lands squeeze the race insert against the rod end ball, such that the clearance resulting from any wear between the two components is compensated for by compressing the race insert.

These and other aspects of the disclosed technology will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

DRAWINGS

Non-limiting and non-exhaustive embodiments of the rod end tensioner and self adjusting rod end, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense. While the self adjusting rod end is described in the context of a turbocharger VTG linkage, the disclosed rod end may be used in other applications.

Figure 1:
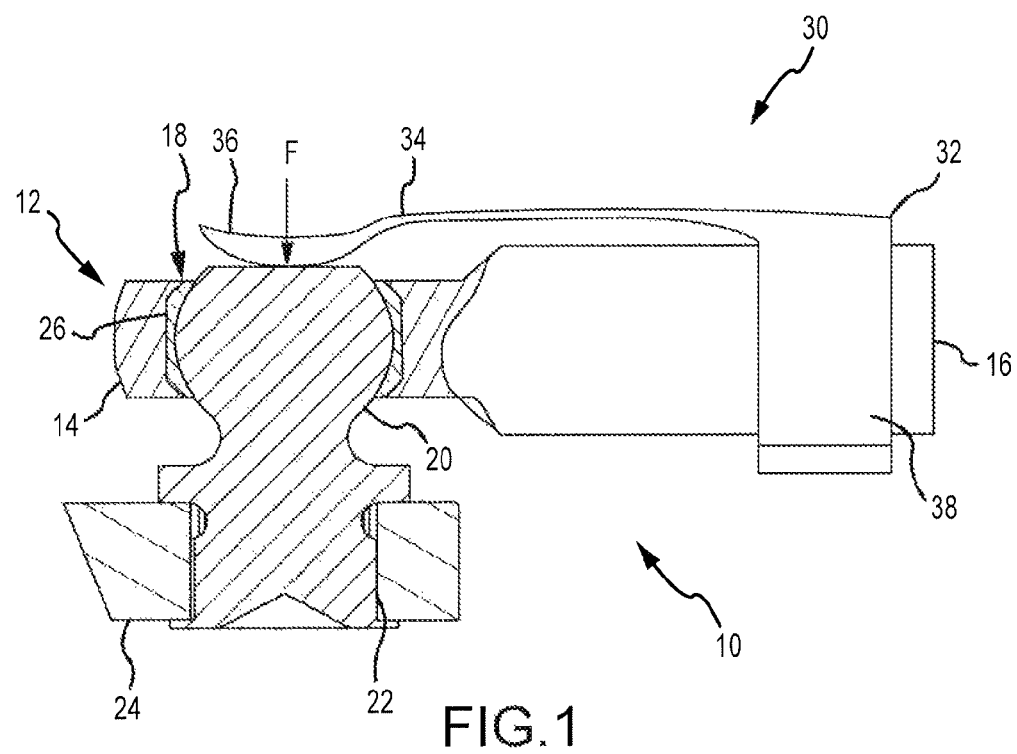
FIG. 1 is a side view in partial cross section illustrating a self adjusting rod end incorporating a rod end tensioner according to a first exemplary embodiment.

Self-adjusting rod end 10, shown in FIG. 1, includes a rod end housing 12, a rod end ball 20, and a rod end tensioner 30, also referred to herein as a spring tensioner. The rod end housing 12 comprises a ball housing portion 14 and a connector portion 16. Connector portion 16 may be a threaded connector with either male or female threads as is known in the art. The ball housing portion 14 includes a bearing opening 18 which is sized and configured to receive a race insert 26. The rod end ball 20 is disposed in race insert 26. In this embodiment, rod end ball 20 includes a threaded portion 22 which is operative to engage a linkage arm 24, for example.

Spring tensioner 30 includes a clip portion 32 with a spring arm 34 extending therefrom. The clip portion 32 is configured to engage the connector portion 16 of the rod end housing 12. The clip portion 32 includes a pair of tangs 38 which wrap around the connector portion 16. The spring arm 34, which may also be referred to as a beam, is operative to apply a force F against the end of rod end ball 20. At a distal end of spring arm 34 is a contact tip 36 that confronts the end of rod end ball 20 as shown. It can be appreciated that spring tensioner 30 acts to push the rod end ball 20 into the race insert. Accordingly, the tensioner 30 acts to take up any slack between the race insert 26 and rod end ball 20. Therefore, the rod end is self-adjusting to compensate for wear between the components. The spring tensioner may be comprised of any suitable resilient material, such as various metals. For example, and without limitation, the spring tensioner may be formed from a spring steel.

Figure 2:
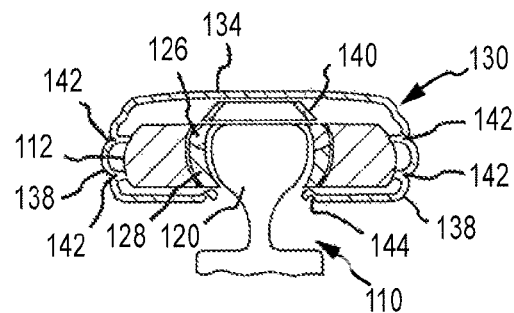
FIG. 2 is a side view in partial cross section illustrating a self adjusting rod end according to a second exemplary embodiment.

FIG. 2 illustrates a self-adjusting rod end 110 according to a second exemplary embodiment. In this embodiment, the rod end tensioner 130 is in the form of a spring clip that engages the rod end housing 112 from the top and bottom. The bottom side of the rod end is defined as the end from which the rod end ball 120 extends, and the top being the opposing side of the rod end. In this case, the race includes an inner race portion 126 and an outer race portion 128 Inner race portion 126 may be a split ring, including a radially extending slit that allows the inner race portion to contract against the rod end ball 120 as the ball and race portions wear against each other. As can be seen in the figure, the inner race portion 126 nests within the outer race portion 128.

The tensioner 130 captures a Belleville washer 140 between a cross member portion 134 and the inner race portion 126. Tensioner 130 includes a pair of fingers 138 which engage the bottom side of the outer race portion 128. A spring loaded cross member 134 extends between fingers 138 and applies a downward force against Belleville washer 140 which in turn pushes against the inner race portion 126. As the cross member portion is spring loaded, it along with the Belleville washer, applies pressure against the inner race portion 126 which in turn slides against the outer race portion to compress the inner race portion against rod end ball 120. In this case the fingers include contact ribs 144 to confront the outer race portion. The tensioner 130 may also include a plurality of centering ribs 142 which confront the outer surfaces of the rod end housing to keep the tensioner centered on the rod end housing. As the inner and outer race portions (126, 128) wear against the rod end ball 120 the tensioner 130 pushes the inner race portion 126 against the rod end ball 120, thereby compensating, or self-adjusting, for wear.

Figure 3:
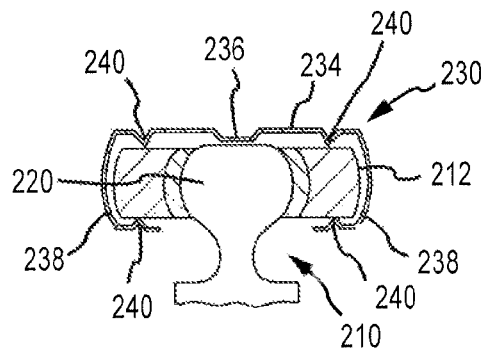
FIG. 3 is a side view in partial cross section illustrating a self adjusting rod end incorporating a rod end tensioner according to a third exemplary embodiment.

FIG. 3 illustrates a self-adjusting rod end 210 according to a third exemplary embodiment. Self-adjusting rod end 210 includes a rod end housing 212 similar to that described above with respect to FIG. 1. In this embodiment, however, the tensioner 230 is in the form of a spring clip that pushes against rod end ball 220. Tensioner 230 includes a pair of fingers 238 which engage the bottom of the rod end housing 212. A spring loaded cross member 234 extends between fingers 238 and includes a contact rib 236 which applies pressure against rod end ball 220. In this case the tensioner 230 includes a plurality of positioning ribs 240 which keep the tensioner 230 properly positioned against the rod end housing 212. As explained above in FIG. 1 with respect to the first embodiment, the tensioner 230 may be comprised of a spring steel. Although the cross member 234 is shown in the figure as being generally flat when installed, the spring loaded cross member 234 may be preloaded, or preformed, by providing an arcuate bend in the cross member portion 234, such that it applies additional force against the rod end ball 220 when fingers 238 engage the bottom of rod end housing 212.

Figure 4:
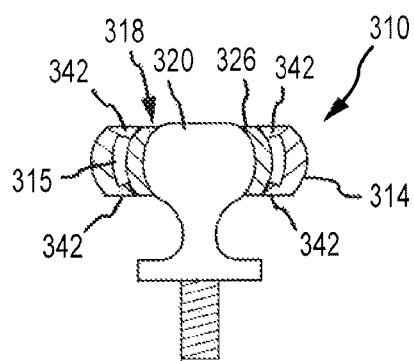
FIG. 4 is a side view in partial cross section illustrating a self adjusting rod end according to a fourth exemplary embodiment.

FIG. 4 illustrates a self-adjusting rod end 310 according to a fourth exemplary embodiment. In this case, the self-adjusting rod end 310 includes a rod end ball 320 that rides in a race insert 326 which is in turn disposed in ball housing portion 314. In this embodiment, the ball housing portion 314 includes a pair of compression lands 342 which are configured to apply pressure against the race insert 326. The compression lands 342 may be formed by forming a groove 315 around the inside of the bearing opening 318. The compression lands 342 squeeze the race insert 326 against rod end ball 320, such that the clearance resulting from any wear between the two components is compensated for by compressing the race insert 326. It should be understood that the race insert 326 and rod end ball 320 may be pressed into the ball housing portion 314, such that the components are pre-compressed. Furthermore, race insert 326 may be in the form of a split ring to facilitate further compression and/or assembly of the self-adjusting rod end 310.

Accordingly, the rod end tensioner and self adjusting rod end have been described with some degree of particularity directed to the exemplary embodiments. It should be appreciated, though, that modifications or changes may be made to the exemplary embodiments without departing from the inventive concepts contained herein.

What is claimed is:

1. A self-adjusting rod end, comprising:
   a rod end housing including:
   a connector portion,
   a ball housing portion having an opening, and
   a race insert assembly comprising a first race and a second race disposed in the opening;
   a rod end ball disposed in the race insert; and
   a rod end tensioner including a clip portion with a spring arm extending therefrom positioned to apply a force against an end of the rod end ball, wherein the clip portion includes a pair of fingers and a spring loaded cross member extending between the fingers positioned to engage the connector portion.

2. The self-adjusting rod end according to claim 1, wherein the spring arm includes a contact tip confronting the end of the rod end ball.

3. A self-adjusting rod end, comprising:
   a rod end housing including:
   a connector portion,
   a ball housing portion having an opening, and
   a race insert assembly disposed in the opening, wherein the race insert includes a nested first inner and a nested second outer race;

a rod end ball disposed in the race insert; and a rod end tensioner comprising a pair of fingers and a spring loaded cross member extending between the fingers positioned to apply a force against one of the first inner race and the nested second outer race.

4. The self-adjusting rod end according to claim 3, wherein the first inner race is a split ring.

5. The self-adjusting rod end according to claim 3, wherein the rod end tensioner is a spring clip positioned to engage the rod end housing from the top and bottom.

6. A self-adjusting rod end comprising:
a rod end housing including:
a connector portion,
a ball housing portion having an opening;
a race insert assembly disposed in the opening, wherein the race insert includes a nested first inner and a nested second outer race;
a rod end ball disposed in the race insert;
a rod end tensioner positioned to apply a force against one of the first inner race and the nested second outer race;
wherein the first inner race is a split ring;
wherein the rod end tensioner is a spring clip positioned to engage the rod end housing from the top and bottom; and
wherein the spring clip includes a pair of fingers positioned to engage a bottom side of the race insert assembly and a spring loaded cross member extending between the fingers to apply a force against at least one of the first inner race or second outer race.

7. The self-adjusting rod end according to claim 6, wherein each of the fingers includes at least one centering rib positioned to confront the rod end housing.

8. The self-adjusting rod end according to claim 6, further comprising a Belleville washer disposed between the cross member portion and the one of the inner and outer race portions.

9. The self-adjusting rod end according to claim 7, wherein the cross member is preloaded by an arcuate bend.

10. A self-adjusting rod end, comprising:
a rod end housing including:
a connector portion,
a ball housing portion having an opening, and
a first race insert nested with a second race insert disposed in the opening;
a rod end ball disposed in the first race insert and the second race insert; and
a spring clip positioned to apply a force against an end of the rod end ball wherein the spring clip includes a plurality of positioning ribs.

11. The self-adjusting rod end according to claim 10, wherein the spring clip includes a pair of fingers positioned to engage the rod end housing and a spring loaded cross member extending between the fingers, wherein the cross member includes a contact rib positioned to apply pressure against the rod end ball.

12. The self-adjusting rod end according to claim 11, wherein the spring loaded cross member is preloaded by an arcuate bend.

* * * * *